MULTIPLE SWITCHING APPARATUS

Filed May 7, 1963 2 Sheets-Sheet 1

INVENTORS

P. J. Grunfelder
L. L. Sevebeck,

BY R. P. Miller
ATTORNEY

March 15, 1966 P. J. GRUNFELDER ET AL 3,240,885

MULTIPLE SWITCHING APPARATUS

Filed May 7, 1963 2 Sheets-Sheet 2

INVENTORS
P. J. Grunfelder
L. L. Sevebeck,

BY R. P. Miller

ATTORNEY

United States Patent Office 3,240,885

Patented Mar. 15, 1966

3,240,885

MULTIPLE SWITCHING APPARATUS

Philip J. Grunfelder, and Laurin L. Sevebeck, Mountainside, N.J., assignors to Western Electric Company, Incorporated, New York, N.Y., a corporation of New York Filed May 7, 1963, Ser. No. 278,678
9 Claims. (Cl. 200—5)

This invention relates to multiple switching apparatus and, more particularly, to such apparatus that may be utilized in transmission systems using multi-frequency signaling.

With the advent of telephone and data transmission circuits utilizing multifrequency signaling in place of dial pulses, a real need exists for simple, low-cost pushbutton switching mechanisms having long useful lives and requiring substantially no mechanical readjustments.

One example of the type of telephone transmission circuits utilizing multifrequency signaling within which the present multiple switching apparatus may be advantageously employed is shown in the copending application of the coinventors L. A. Meacham and F. West, Serial No. 759,474, filed September 8, 1958, now Patent Number 3,184,554, granted May 18, 1965. That circuit employs an oscillator located at a telephone substation and powered over a telephone line, a pair of tuned circuits for establishing any one of a plurality of pairs of frequencies of oscillation of the oscillator, and means for connecting the oscillator to the telephone line and performing other switching functions as well. To utilize the oscillator of such a system, it is advantageous that an array of pushbuttons be mounted so as to operate contacts and determine the various combinations of pairs of frequencies provided by the tuned circuit and to perform the necessary switching functions.

An oscillator of the above-mentioned type has also been employed in circuits for transmitting data in the form of coded alternating-current multifrequency signals over available telephone networks. One such circuit is disclosed in the copending application of the coinventors M. V. Di Iorio, P. J. Grunfelder, and L. L. Sevebeck, Serial No. 784,983, filed January 5, 1959, now Patent 3,131,259 issued April 28, 1964. Transmitting data by such a system involves generating a plurality of alternating-current voltages of different frequencies, combining selected ones of these voltages so as to provide for each data character a coded multifrequency signal, transmitting such coded signals over a telephone network in space-time relationship, and effecting a determination of the component alternating-current voltages of the coded multifrequency signals sent over the network to provide a reading of each data character. As in the above-mentioned telephone transmission system, it is also here advantageous that an array of pushbuttons be mounted so as to operate contacts and determine any of the various combinations of multifrequency signals required for such coded multifrequency data transmission. One example of a switching mechanism for performing the above functions is disclosed in the copending application of the coinventors P. J. Grunfelder, E. C. Proehle, and L. L. Sevebeck, Serial No. 72,345 filed November 29, 1960 now Patent 3,120,584, issued February 4, 1964.

It is the general object of the invention, therefore, to provide reliable, low-cost multiple switching mechanisms requiring a minimum number of connections and being of such construction as to provide ease of manufacture and long maintenance-free operation.

It is another object of the invention to provide a plate having an array of tab contacts any one of which may be moved by a pushbutton device into contact with one of a second array of stationary contacts to energize a control circuit.

It is a further object of the invention to provide an array of pushbuttons any one of which may be depressed to energize selectively a circuit for transmitting a multi-frequency signal, and upon further depression to energize a second circuit for controlling the first circuit.

Other objects and advantages of the invention will become apparent upon consideration of the following detailed description, in conjunction with the accompanying drawings, in which.

With these and other objects in mind, the present invention contemplates a multiple switching apparatus which includes an array of pushbutton devices any one of which may be depressed to operate one of an array of switching crosspoints and flex one of an array of conductive tabs into engagement with a conductive plate. This switching apparatus also includes an expandable unitary spring conductor positioned below various ones of the pushbutton devices. Spaced from the spring conductor is a printed circuit board having an array of apertures which provide the switching crosspoints. Spaced from the printed circuit board is a resilient metal sheet having the array of flexible conductive tabs which are formed in the sheet by removing undulating or U-shaped strips from the sheet. The arrays of pushbutton devices, apertures in the printed circuit board, and the tab contacts are in axial alignment with one another. When any one of the pushbutton devices is depressed, the spring conductor is expanded into engagement with the peripheral portion of the aligned aperture of the switching crosspoint on the printed circuit board. The pushbutton device also engages the aligned tab contact and moves it into engagement with a ground plate to energize a control circuit for controlling the signal of the printed circuit.

Figure 1:
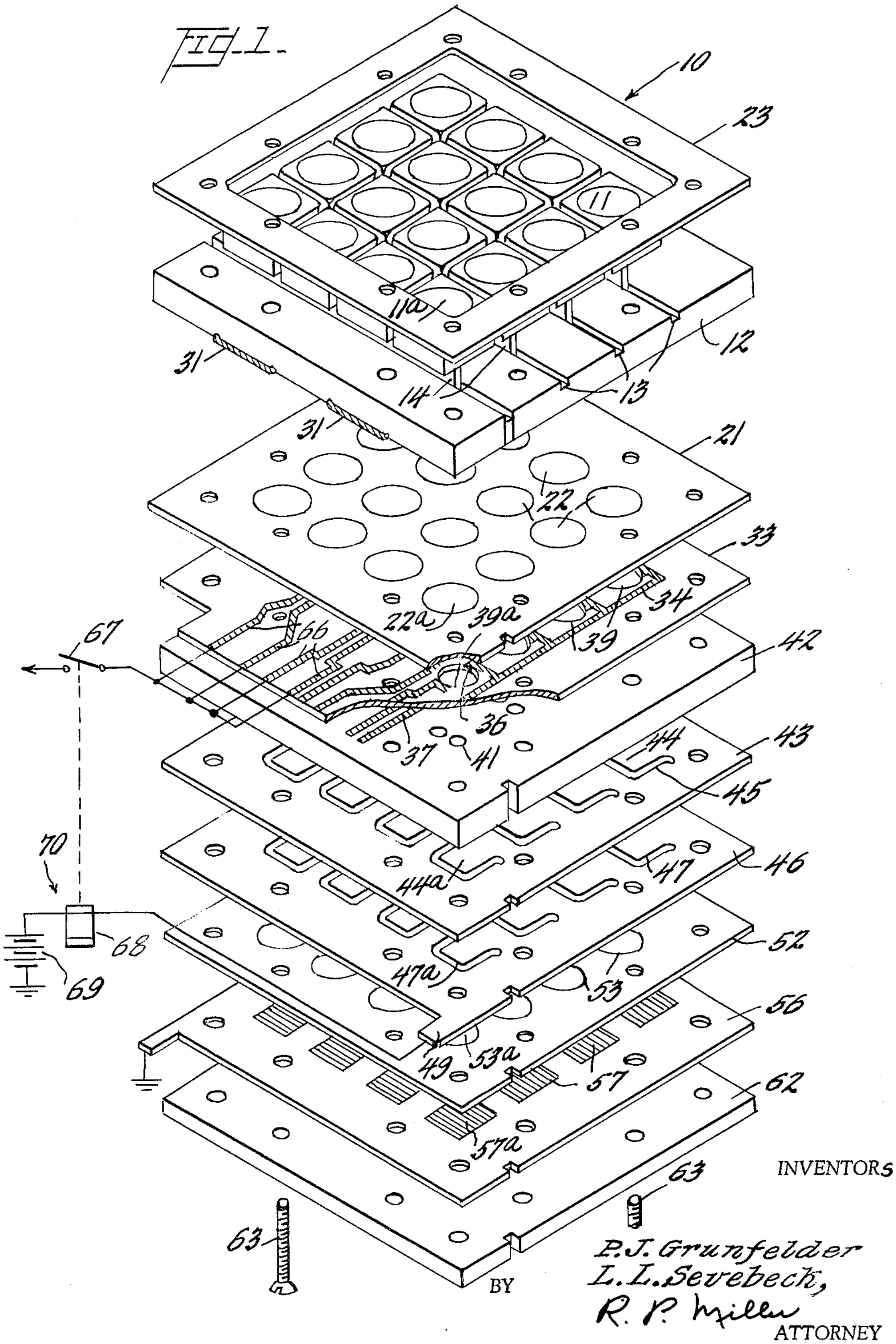
FIG. 1 is an exploded diagrammatic view embodying the principles of the present invention which comprises a printed circuit board having an array of apertures through various ones of which printed circuitry passes so as to define a plurality of switching crosspoints, a plate having an array of bendable tab contacts, and a second plate having an array of stationary electrical contacts.
Figures 2, 3, 4, 5:
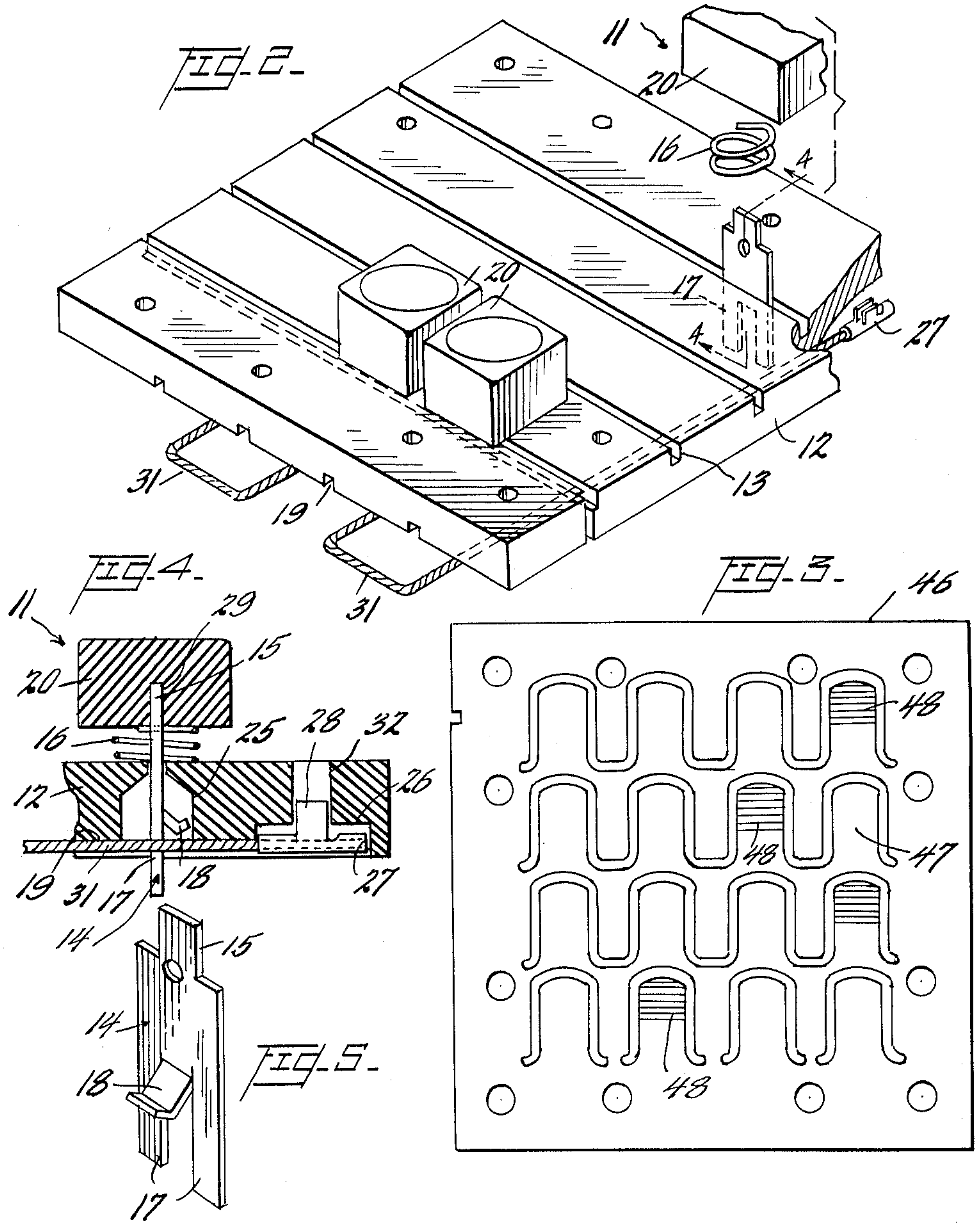
FIG. 2 is n exploded diagrammatic view of a guide plate having mounted thereon an array of pushbutton devices.
FIG. 3 is a bottom detail view of a contact plate having an array of bendable tab contacts each of which has a suitable metal contact attached thereto.
FIG. 4 is a cross-section view taken on line 4—4 of FIG. 2 showing a pushbutton and actuator mounted for reciprocation into engagement with a coiled spring conductor.
FIG. 5 is a perspective view of a key bar or actuator having an angular projecting section and a pair of legs.

Referring to FIGS. 1 and 2, there is illustrated a matrix switch assembly 10 comprising an array of sixteen pushbuttons 11 and a plurality of layers of insulator plates 21, 43, and 52 held together by conventional connecting means 63, a printed circuit board 33, a contact plate 46, and a ground contact plate 56.

More particularly, switch assembly 10 comprises a retaining plate 23 below which is positioned an upper guide plate 12 having four transverse slots 13 extending across the top face. Along the valley of each of slots 13 and extending therefrom to the bottom face of plate 12 are four equally spaced apertures 25 (see FIG. 4) through which pass pushbutton devices 11. Each pushbutton device 11 is comprised of a head portion or pushbutton 20 and a depending shank or key bar 14. Each of the key bars or actuators 14 has a shoulder and neck portion 15 that extends up from the top face of plate 12, through a pushbutton support spring 16 and into a rectangular slot 29 in the bottom face of an associated pushbutton 11 to which it is fixedly connected. The bottom portion of each key bar 14 extends downward from plate 12 and is bifurcated to define a pair of legs 17. Key bar 14 has a bent or angular projecting section 18 at the junction of its legs 17 which engages a unitary coiled spring ground wire or expandable conductor 31 on depression of any one of the pushbuttons 11.

On the bottom face of upper guide plate 12 are four parallel longitudinal slots 19 (see FIG. 2) which pass under the four rows of apertures 25. Within slots 19 and bending around the ends of plate 12 is the coiled spring ground wire 31. Terminals 27 (see FIG. 4) are clamped to each end portion of ground wire 31 and are positioned in an enlarged cross-section portion 26 of the first and fourth longitudinal slots 19. Extending upwardly from the valleys of the enlarged cross-sections 26 are locking apertures 32 within which protruding keys 28 of terminals 27 are securely positioned.

Below top plate 12 there are positioned seriatim an insulating spacer plate 21, a printed circuit board 33, and a bottom guide plate 42. Plate 21 is provided with an array of apertures 22, each of which is in axial alignment with a key bar 14. Printed circuit board 33 is provided with an array of apertures 39 each of which is in axial alignment with a key bar 14, but the apertures 39 are smaller in diameter than the corresponding aperture in array 22 of spacer plate 21. The printed circuitry of board 33 lies partially on both the top and bottom faces of the board as indicated at 34 and 37 and passes from one face to the other by way of conductive material 36 on portions of the peripheries of various apertures of array 39. Such printed circuitry may be designed by one skilled in the art to provide the multifrequency switching characteristics as desired. Bottom guide plate 42 is provided with an array of pairs of apertures 41 each of which pair is in axial alignment with a key bar 14. The legs 17 of each key bar 14 pass through the pair of apertures 41 which acts to guide the linear movement of each respective key bar.

Below bottom guide plate 42 there are positioned seriatim an insulator plate 43, a contact plate 46, a second spacer plate 52, a ground contact plate 56, and a bottom plate 62. Insulator plate 43 is made of a resilient insulating material and is provided with an array of resilient, bendable tabs 44 which have been formed by removing an undulating strip or U-shaped portions 45 as by stamping or some other suitable means. As shown in FIG. 3, the removed portion may be a continuous series of U-shaped portions or each U may be separate and distinct.

Positioned below insulator plate 43 is a similarly shaped contact plate 46 having an array of resilient, bendable tab contacts 47. Plate 46 may be made of a suitable spring metal conductive sheet in which the resilient tab portions 47 provide suitable electrical contacts. If desired, a separate conductive portion 48 may be attached to the bottom face of each tab 47 by deposition, welding, or some other suitable means. Each of the tabs 44 and 47 is in axial alignment with a key bar 14 and with an aperture 39 of printed circuit board 33.

Below contact plate 46 is positioned a second spacer plate 52 provided with an array of apertures 53 each of which is in axial alignment with a key bar 14. Below spacer plate 52 is a metal ground contact plate 56 which may be provided with an array of electrical contacts 57 each of which is in axial alignment with one of the bendable tab contacts 47.

A bottom plate 62 is positioned below ground contact plate 56. A plurality of fasteners such as bolts 63 extend axially through the entire series of plates to hold the matrix switch together.

Printed circuit 34 has terminals 66 to which is connected a switch having contacts 67. Contact plate 46 has a terminal 49 connected to a second circuit 70 comprising a relay 68 and a power source 69. Ground contact plate 56 is grounded. Upon closure of any of the array of contacts 47 and 57, the second circuit is completed energizing relay 68 which closes contacts 67. It is to be understood that contacts 47 and 57 can be used to perform any number of functions such as energization of the oscillator or connection of the oscillator to a telephone line, and that the particular circuit shown is merely exemplary.

The operation of switch assembly 10 is best explained by examining the interrelationship of the various components during the downward movement of one of the plurality of pushbuttons, for example the pushbutton shown as 11*a* in the drawing. As is evident from FIG. 4, each of pushbuttons 11 is held above upper guide plate 12 by pushbutton support spring 16 placed about that portion of key bar 14 that lies above plate 12.

The coiled spring ground wire 31 passes between legs 17 and into engagement with the bent section 18 of key bars 14 and across the apertures of array 39 of printed circuit board 33. Because of spacer plate 21 and the resilient character of coiled spring ground wire 31, the latter does not engage any portion of the printed circuit prior to the depression of the pushbutton 11*a*. Upon the depression of pushbutton 11*a*, the bent section 18 of the key bar 14 associated with the depressed pushbutton moves downwardly and forces ground wire 31 to expand down and through the apertures 22*a* and 39*a* axially aligned therewith. Upon such downward expansion, ground wire 31 engages opposite peripheral conductive portions 36 of the aperture 39*a* through which it is expanded. This engagement is characterized by a wiping action which provides self-cleaning contact surfaces.

As bent section 18 is acting to expand ground wire 31, the ends of legs 17 of key bar 14 are moved into engagement with insulating tab 44*a* which is positioned against tab contact 47*a*. Further depression of pushbutton 11*a* bends resilient, insulating tab 44*a* and resilient tab contact 47*a* through aperture 53*a* of spacer plate 52 whereupon tab contact 47*a* moves into electrical contact with contact 57*a* of ground plate 56. It will be observed that bent section 18 and legs 17 of key bar 14 may be made of such dimensions so as to have tab contact 47*a* engage contact 57*a* at any desired predetermined instant during the downward movement of pushbutton 11*a*. For example, legs 17 can be made sufficiently long so as to close contacts 47 and contacts 57 of the ground plate 56 prior to the time when bent section 18 moves coiled spring ground wire 31 into engagement with printed circuit 34. Similarly, legs 17 may be shortened to provide any other sequence of switching which may be desired. The closing of contacts 47*a* and 57*a* closes the second circuit 70 which energizes relay 68 which, in turn, closes contacts 67 to provide, for example, a power source for the multifrequency signal of printed circuit 34.

It will be appreciated that the above-described arrangements are merely illustrative of the principles of the invention. Numerous other arrangements and modifications may be devised by one skilled in the art without departing from the spirit and scope of the invention.

What is claimed is:

1. In a composite switch,
   a first conductive planar plate having a plurality of undulating slits to form an array of resilient tab contacts in the plane of the plate,
   a second conductive planar plate having an area coextensive with the tabs in said first plate,
   means between said first and second plates for supporting and insulating said plates in spaced parallel relationship,
   an array of pushbutton devices each of which is in alignment with said array of tab contacts, and
   means supporting and guiding each pushbutton device for rectilinear movement to move a tab contact into engagement with said second conductive plate.

2. In a composite switch,
a first conductive plate,
an insulating plate parallelly mounted on said conductive plate,
said insulating plate having a predetermined array of apertures formed therein,
a second conductive plate constructed of resilient metal parallelly mounted on said insulating plate,
said second conductive plate having an array of U-shaped slits to form an array of tabs corresponding to said predetermined array of apertures,
an array of pushbuttons having extending actuators,
and means for mounting said pushbuttons to move said actuators through said apertures to flex said tabs into engagement with said first conductive plate.

3. A composite switch comprising,
an array of switching crosspoints,
an expandable spring conductor supported in spaced relationship above said crosspoints,
a first conductive plate having an array of resilient tab contacts in axial alignment below said array of switching crosspoints,
a second conductive plate supported in spaced relationship below said tab contacts, and
an array of actuator means supported and guided in axial alignment above said crosspoints and tab contacts comprising a depending shank having an angular projecting section to move said expandable spring conductor into engagement with a crosspoint and a leg to move a tab contact into engagement with said second conductive plate upon the depression of any one of said actuator means.

4. A composite switch comprising,
a first conductive plate having an array of resilient tab contacts,
a second conductive plate,
means positioned between said first and second plate for supporting said second plate spaced below said tab contacts,
an array of actuator means supported above and in axial alignment with said tab contacts and guided for depression into engagement with said aligned tab contacts to move said tab conduits into engagement with said conductive plate,
an expandable spring conductor spaced below said actuator means which is engaged and moved by the depression of any one of said actuator means,
an array of switching crosspoints spaced between said expandable spring conductor and said array of tab contacts,
means between said spring conductor and said crosspoints for insulating said conductor and crosspoints from one another when no one of the actuator means is depressed, and
means mounting the crosspoints in position for engaging and wiping action by the movement therepast of the spring conductor upon depression of any of the actuator means.

5. A composite switch comprising,
a plurality of pushbutton devices,
means for guiding the pushbutton devices for selective linear movement along parallel paths,
an expandable conductor mounted on said guiding means in position for engagement and movement by said linear movement of any of said pushbutton devices,
a plurality of switching crosspoints,
each of said switching crosspoints comprising a pair of spaced contact elements that are bridge by the depression of the expandable conductor,
means for mounting said switching crosspoints in axial alignment with the path of movement of said expandable conductor,
a plate having a plurality of flexible conductive tabs,
means mounting said plate to position said tabs for engagement and pivotal movement by said pushbutton devices,
a conductive plate,
and means mounting said conductive plate a distance from the tabs and in position for engagement by any pivoted tab.

6. A composite switching structure comprising an array of switching crosspoints,
an expandable spring conductor mounted in spaced relationship to said crosspoints,
a contact plate having a plurality of U-shaped slits to form an array of pivotable tabs corresponding to the array of switching crosspoints,
means for mounting the plate in spaced relationship to said crosspoints to axially align the tabs with crosspoints,
a conductive plate,
means mounting the conductive plate in spaced relationship to said contact plate and in position for engagement by the pivotal movement of any of said tabs,
an array of pushbutton devices corresponding to the array of switching crosspoints and tabs,
and means for mounting said pushbutton devices to selectively and successively move said spring conductor into engagement with a switching crosspoint and pivot said tabs into engagement with said conductive plate.

7. A pushbutton controlled crosspoint switching assembly for controlling electrical circuits comprising
an array of depressible pushbutton means,
a guide plate for mounting said pushbutton means for linear movement,
an expandable spring conductor,
means supporting said spring conductor below said guide plate and various ones of said pushbutton means for expansion by engagement with any one of said depressible pushbutton means,
circuit means comprising an array of switching crosspoints, each axially aligned with one of said pushbutton means,
means supporting said circuit means spaced from said spring conductor for engagement of only that switching crosspoint aligned with a partially depressed pushbutton means with the expanded portion of said spring conductor,
an array of blendable tab contacts,
a conductive ground plate,
means supporting said bendable tab contacts and conductive ground plate in axial alignment with various ones of said pushbutton means for movement by one of the bendable tab contacts into engagement with the conductive plate upon depression of any one of said pushbutton means.

8. The combination in accordance with claim 7 wherein said pushbutton devices comprise keybars having
an angular projecting section for engagement with said expandable spring conductor,
and a pair of legs straddling said expandable spring conductor for moving said bendable tab contacts.

9. The combination in accordance with claim 7 wherein said array of bendable tab contacts comprise a sheet of conductive material having a plurality of rows of undulating slits to provide said tab contacts.

References Cited by the Examiner

UNITED STATES PATENTS

| | | | |
|---|---|---|---|
| 2,483,551 | 10/1949 | Libman | 339—18 |
| 2,879,458 | 3/1959 | Schubert | 339—18 X |
| 2,966,559 | 12/1960 | Meyer | 200—6 |
| 3,085,746 | 4/1963 | Pasinski et al. | 200—5 X |
| 3,120,584 | 2/1964 | Grunfelder et al. | 200—5 |

KATHLEEN H. CLAFFY, *Primary Examiner.*

BERNARD A. GILHEANY, *Examiner.*